(12) United States Patent
Yokoyama

(10) Patent No.: US 10,203,503 B2
(45) Date of Patent: Feb. 12, 2019

(54) IMAGE DISPLAY APPARATUS AND OPTICAL ELEMENT HAVING LIGHT GUIDE PLATE WITH GRATING PITCHES ON LIGHT INCIDENT AND EMITTING SECTIONS THEREOF

(71) Applicant: SEIKO EPSON CORPORATION, Tokyo (JP)

(72) Inventor: Osamu Yokoyama, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 61 days.

(21) Appl. No.: 15/460,866

(22) Filed: Mar. 16, 2017

(65) Prior Publication Data

US 2017/0276947 A1 Sep. 28, 2017

(30) Foreign Application Priority Data

Mar. 23, 2016 (JP) .................................. 2016-058107

(51) Int. Cl.
*G02B 5/18* (2006.01)
*G02B 27/01* (2006.01)
*G02B 5/32* (2006.01)
*F21V 8/00* (2006.01)
*G02B 27/42* (2006.01)

(52) U.S. Cl.
CPC ....... *G02B 27/0172* (2013.01); *G02B 5/1814* (2013.01); *G02B 5/32* (2013.01); *G02B 6/0016* (2013.01); *G02B 6/0035* (2013.01); *G02B 27/4233* (2013.01); *G02B 2027/0118* (2013.01);

(Continued)

(58) Field of Classification Search
CPC ........................ G02B 5/18; G02B 2005/1804; G02B 5/1819; G02B 5/1828; G02B 5/1842; G02B 5/1866; G02B 27/42; G02B 27/4205; G02B 27/4211; G02B 27/4216; G02B 27/4283; G02B 27/01; G02B 27/0101; G02B 27/0103; G02B 2027/011; G02B 27/017;

(Continued)

(56) References Cited

U.S. PATENT DOCUMENTS

| 7,502,168 B2 * | 3/2009 | Akutsu | G02B 5/1861 |
| | | | 359/15 |
| 2007/0188837 A1 * | 8/2007 | Shimizu | G02B 5/203 |
| | | | 359/13 |

(Continued)

FOREIGN PATENT DOCUMENTS

| JP | 2008-535032 A | 8/2008 |
| JP | 2009-133998 A | 6/2009 |

(Continued)

*Primary Examiner* — Arnel C Lavarias
(74) *Attorney, Agent, or Firm* — Oliff PLC

(57) ABSTRACT

An image display apparatus includes an image light generating unit that emits image light; a light guide plate in which the image light emitted from the image light generating unit is incident; an incident side diffraction optical element disposed in a light incident section of the light guide plate; and an emission side diffraction optical element disposed in a light emitting section of the light guide plate, wherein a grating pitch of the incident side diffraction optical element and the grating pitch of the emission side diffraction optical element are different in a state where the image light generating unit is not in operation.

15 Claims, 11 Drawing Sheets

(52) U.S. Cl.
CPC .......... *G02B 2027/0132* (2013.01); *G02B 2027/0174* (2013.01); *G02B 2027/0178* (2013.01)

(58) Field of Classification Search
CPC ........ G02B 27/0172; G02B 2027/0174; G02B 2027/0178
USPC ....... 359/558, 566, 569, 570, 571, 573, 574, 359/575, 576; 362/600, 606, 607, 608, 362/615, 619, 620, 621
See application file for complete search history.

(56) References Cited

U.S. PATENT DOCUMENTS

| | | |
|---|---|---|
| 2009/0141324 A1 | 6/2009 | Mukawa |
| 2013/0242555 A1* | 9/2013 | Mukawa .............. G02B 3/0006 362/237 |
| 2015/0229897 A1 | 8/2015 | Mukawa |
| 2015/0277125 A1 | 10/2015 | Hirano et al. |

FOREIGN PATENT DOCUMENTS

| | | |
|---|---|---|
| JP | 2010-271554 A | 12/2010 |
| JP | 2015-148782 A | 8/2015 |
| JP | 2015-184561 A | 10/2015 |
| WO | 2006-106501 A1 | 10/2006 |

* cited by examiner

IMAGE DISPLAY APPARATUS AND OPTICAL ELEMENT HAVING LIGHT GUIDE PLATE WITH GRATING PITCHES ON LIGHT INCIDENT AND EMITTING SECTIONS THEREOF

BACKGROUND

1. Technical Field

The present disclosure relates to image display apparatuses and optical elements.

2. Related Art

In recent years, wearable image display apparatuses such as head mount displays (hereinafter, referred to as HMD) have been attracting attention. Such HMD includes a diffraction light guide plate type which is configured to diffract image light by diffraction optical elements formed in a light incident section and a light emitting section of a light guide plate so that the light is propagated in the light guide plate by total reflection. JP-A-2009-133998 is an example of related art.

It has been proposed to use a plastic material or the like for the light guide plate of the HMD in order to reduce the weight or prevent damage due to impact. Since plastic has a linear expansion coefficient larger than that of a glass, the light guide plate expands or contracts with a temperature change and the grating pitch of the diffraction optical elements formed in the light incident side or the light emitting section on the surface of the light guide plate changes accordingly.

For example, depending on the usage of the HMD, temperature difference occurs between the light incident section and the light emitting section of the light guide plate, which may cause the grating pitch of the diffraction optical elements provided in the light incident section and the light emitting section to be different. As the grating pitch increases, the diffraction angle decreases. Accordingly, when the diffraction angle becomes smaller than the critical angle of the light guide plate, light fails to be propagated in the light guide plate by total reflection, which causes a loss in the light emitted from the light emitting section (image light).

SUMMARY

An advantage of some aspects of the present embodiment is that an image display apparatus which emits image light without loss regardless of occurrence of temperature difference between the light incident section side and the light emitting section side of the light guide plate is provided. Further, another advantage of some aspects of the present embodiment is that an optical element which emits light without loss regardless of occurrence of temperature difference between the light incident section side and the light emitting section side of the light guide plate is provided.

According to a first embodiment, provided is an image display apparatus which includes: an image light generating unit that emits image light; a light guide plate in which the image light emitted from the image light generating unit is incident; an incident side diffraction optical element disposed in a light incident section of the light guide plate; and an emission side diffraction optical element disposed in a light emitting section of the light guide plate, wherein a grating pitch of the incident side diffraction optical element and the grating pitch of the emission side diffraction optical element are different in a state where the image light generating unit is not in operation.

According to the image display apparatus in the first embodiment, the grating pitch is provided so as to compensate a difference between the grating pitch of the incident side diffraction optical element and the grating pitch of the emission side diffraction optical element which occurs due to a temperature change of the light guide plate. Accordingly, when the spectrum of the image light which enters the light incident section has a width or the light is a colored light having a plurality of wavelengths, blur or ghost of the image can be prevented from occurring.

In the first embodiment, the following formula is preferably established when a minimum incident angle at which a diffraction angle by the incident side diffraction optical element becomes minimum among incident angles of a light beam of the image light which enters the incident side diffraction optical element is $\theta_{min}$, a shorter wavelength of wavelengths at a half of a peak intensity of spectrum of the image light is $\lambda_{min}$, and the grating pitch of the incident side diffraction optical element at a maximum temperature during use of the light guide plate is P.

$$P \leq \lambda_{min}/(1-\sin\theta_{min})$$

With this configuration, loss, blur or ghost of the image can be prevented even if the temperature of the light incident section of the light guide plate increases to the maximum temperature during use in use of the apparatus.

In the first embodiment, the following formula is preferably established when a minimum incident angle at which a diffraction angle by the incident side diffraction optical element becomes minimum among incident angles of a light beam of the image light which enters the incident side diffraction optical element is $\theta_{min}$, a shorter wavelength of wavelengths at a half of a peak intensity of spectrum of the image light is $\lambda_{min}$, and the grating pitch of the incident side diffraction optical element at a temperature of the light guide plate lower than the maximum temperature during use is P.

$$P < \lambda_{min}/(1-\sin\theta_{min})$$

With this configuration, loss, blur or ghost of the image can be prevented even if the temperature of the light incident section of the light guide plate increases to around a temperature lower than the maximum temperature during use in use of the apparatus.

In the first embodiment, the following formula is preferably established when a minimum incident angle at which a diffraction angle by the incident side diffraction optical element becomes minimum among incident angles of a light beam of the image light which enters the incident side diffraction optical element is $\theta_{min}$, a shorter wavelength of wavelengths at a half of a peak intensity of spectrum of the image light is $\lambda_{in}$, and the grating pitch of the incident side diffraction optical element when a temperature of the light guide plate is normal temperature is P.

$$P < \theta_{min}/(1-\sin\theta_{min})$$

With this configuration, loss, blur or ghost of the image can be prevented even if the temperature of the light incident section of the light guide plate slightly increases from normal temperature in use of the apparatus.

In the first embodiment, the light guide plate is preferably made of a plastic material.

With this configuration, the above effect can be more notably achieved since the light guide plate easily deforms by a temperature change.

In the first embodiment, the incident side diffraction optical element and the emission side diffraction optical element are preferably surface relief diffraction gratings.

With this configuration, high diffraction efficiency can be maintained across a wide angular range.

In the first embodiment, the incident side diffraction optical element and the emission side diffraction optical element are preferably surface volume holograms. With this configuration, high diffraction efficiency can be achieved.

According to a second embodiment, provided is an optical element which includes: a light guide plate which includes a light incident section and a light emitting section and is configured to propagate light incident from the light incident section by total reflection and to emit light from the light emitting section; an incident side diffraction optical element disposed in the light incident section; and an emission side diffraction optical element disposed in the light emitting section, wherein a grating pitch of the incident side diffraction optical element and the grating pitch of the emission side diffraction optical element are different in a state where the light is not incident.

According to the optical element in the second embodiment, the grating pitch is provided so as to compensate a difference between the grating pitch of the incident side diffraction optical element and the grating pitch of the emission side diffraction optical element which occurs due to a temperature change of the light guide plate. Accordingly, when the spectrum of the light which enters the light incident section has a width or a plurality of wavelengths, blur or ghost of the emitted light can be prevented from occurring.

BRIEF DESCRIPTION OF THE DRAWINGS

The embodiment will be described with reference to the accompanying drawings, wherein like numbers reference like elements.

DESCRIPTION OF EXEMPLARY EMBODIMENTS

Figure 1:
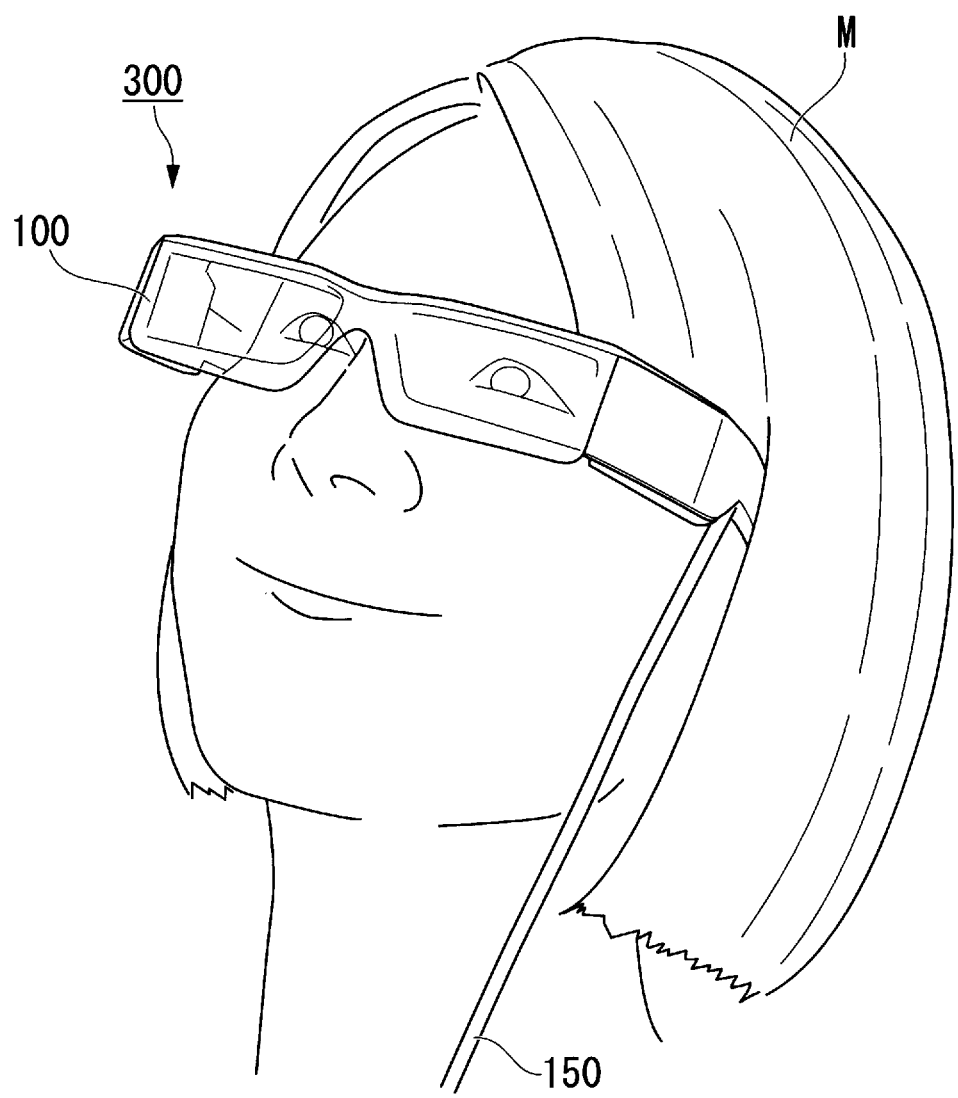
FIG. 1 is a view which shows that an HMD according to the present embodiment is worn by a user.

With reference to the drawings, an embodiment will be described in detail. In the drawings used for the following description, components are not necessarily shown to scale since a characteristic portion may be shown enlarged for convenience of understanding.

An image display apparatus according to the present embodiment is an example of a head mount display that a user wears on his/her head when in use. In the following description, a head mount display is abbreviated to HMD.

Figure 2:
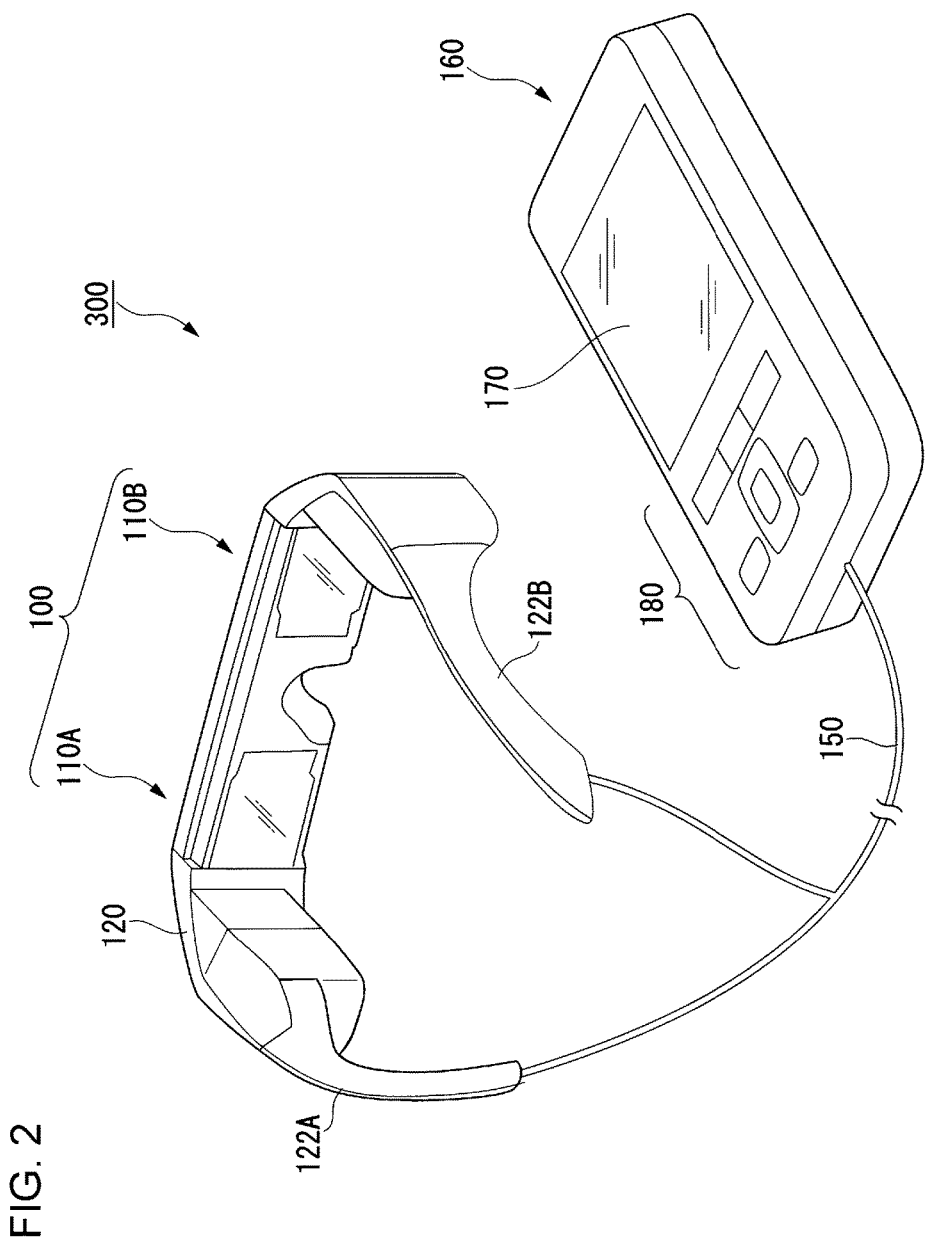
FIG. 2 is a perspective view of the HMD according to the present embodiment.

FIG. 1 is a view which shows that an HMD according to the present embodiment is worn by the user. FIG. 2 is a perspective view of the HMD according to the present embodiment. As shown in FIG. 1, an HMD 300 according to the present embodiment is worn by the user on his/her head when in use just like the way he/she wears eyeglasses. The HMD 300 of the present embodiment is a see-through type (transparent type) HMD. According to the HMD 300 of the present embodiment, the user can visually recognize an image generated by an image display unit as well as an outside image such a view outside the HMD 300.

As shown in FIG. 2, the HMD 300 includes a display apparatus 100 having a glass like shape, and a controller (controller) 160 with a size that can be hand-held by the user. The display apparatus 100 and the controller 160 are communicatively connected to each other via a wired or wireless network. In the present embodiment, a left eye image display unit 110A and a right eye image display unit 110B, which constitute the display apparatus 100, are each wiredly connected to the controller 160 via a cable 150 so as to communicate an image signal or a control signal.

The display apparatus 100 includes a main frame (apparatus main body) 120, the left eye image display unit 110A, and the right eye image display unit 110B. The controller 160 includes a display 170 and an operation button section 180.

The display 170 displays, for example, various information and instruction for the user. The main frame 120 includes a pair of temples 122A, 122B which are hooked on the user's ears. The main frame 120 is a member that supports the left eye image display unit 110A and the right eye image display unit 110B.

The right eye image display unit 110B and the left eye image display unit 110A have a similar configuration, and components in each of the image display units are symmetrically arranged on the right and left sides. Therefore, the left eye image display unit 110A is hereinafter simply referred to as an image display unit 110, and the description for the right eye image display unit 110B will be omitted.

Figure 3:
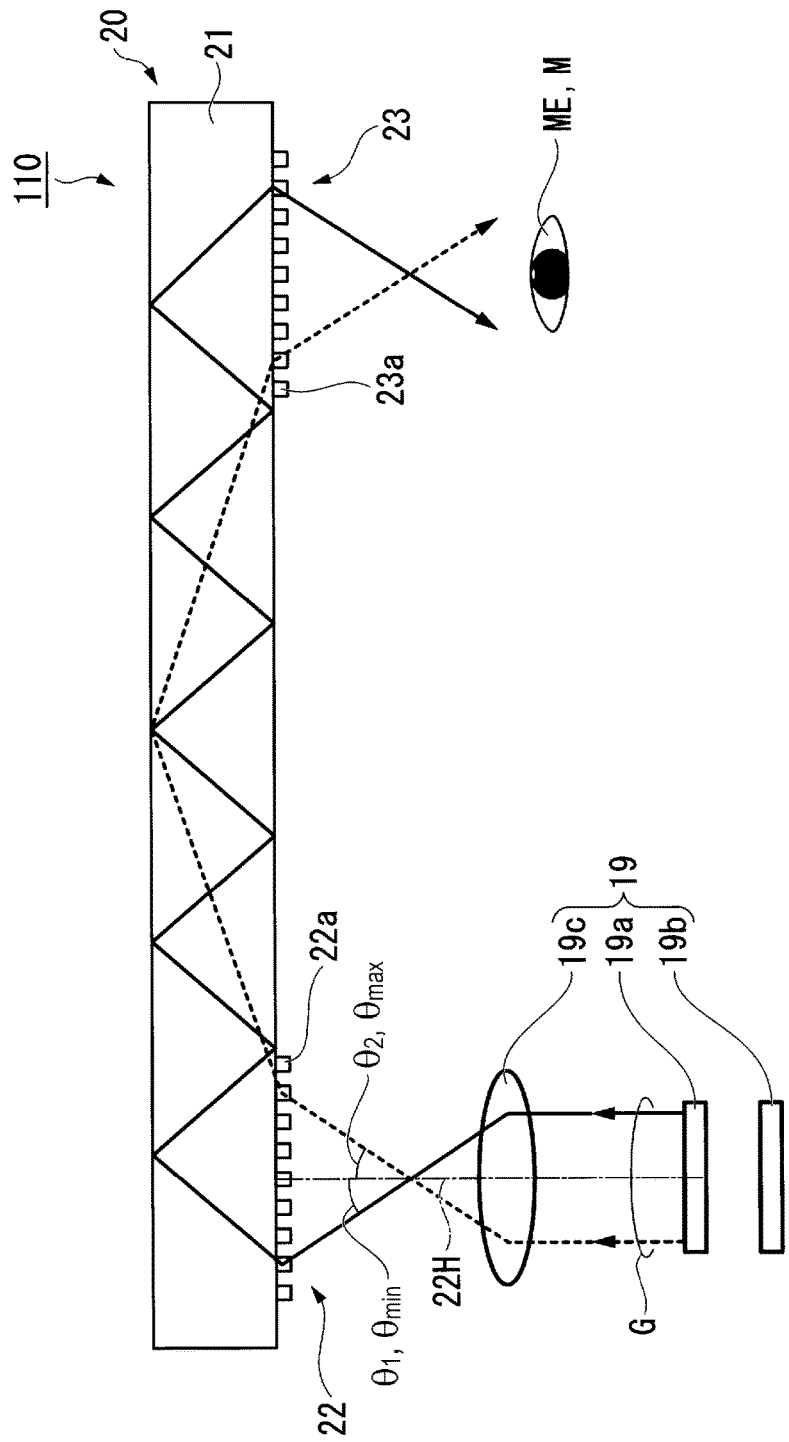
FIG. 3 is a view which shows a configuration of an image display unit.

FIG. 3 is a cross sectional view which shows a configuration of the image display unit 110. As shown in FIG. 3, the image display unit 110 includes an image light generating unit 19 and a light guide unit 20. The image light generating unit 19 emits an image light G which includes image information. The image light generating unit 19 includes an image display element 19a, a back light 19b and a collimator lens 19c.

The image display element 19a may be, for example, a liquid crystal panel. The back light 19b illuminates the image display element 19a composed of a liquid crystal panel and is formed of, for example, a light emitting diode (LED). Further, the image display element 19a may be an organic EL panel. In this case, the back light is not necessary.

The image display element 19a includes a plurality of pixels. The collimator lens 19c collimates the image light G generated by the image display element 19a. Specifically, light (image light G) emitted from the pixels of the liquid crystal panel which constitutes the image display element 19a is converted into a collimated light having an emission angle which corresponds to a position of the pixel by the collimator lens 19c, and enters the light guide unit 20. Accordingly, the image light G enters the light guide unit 20 at a predetermined angular range (angle of view). The image light G may be color light which includes the respective colors of RGB or may be monochromatic light.

The light guide unit 20 includes a light guide plate 21, a light incident section 22 and a light emitting section 23. In the present embodiment, the light guide plate 21 is a transparent optical plastic, and may be a cyclic polyolefin polymer resin, acrylic resin, polycarbonate or the like.

The light incident section 22 introduces the image light G by diffracting the image light G by the light guide plate 21. The light guide plate 21 propagates the image light G introduced inside as described below by total reflection. The light emitting section 23 extracts the image light G which has been propagated in the light guide plate 21 by total reflection and emits the image light G to an eye ME of an observer M.

The light incident section 22 is provided with an incident side diffraction optical element 22a. The light emitting section 23 is provided with an emission side diffraction optical element 23a. The incident side diffraction optical element 22a and the emission side diffraction optical element 23a can be selected as appropriate from a surface relief diffraction grating and a volume hologram depending on the required performance. The surface relief diffraction grating has an advantage that high diffraction efficiency can be maintained across a wide angular range. Further, the volume hologram has an advantage that high diffraction efficiency can be obtained.

When the image light G emitted from the light emitting section 23 enters the eye ME of the observer M, the observer M can visually recognize a virtual image. The size of virtual image is determined depends on the angle of view of the image light G which enters the light guide unit 20.

In the image display unit 110 of the present embodiment, light from the pixels located on both ends of the liquid crystal panel that constitutes the image display element 19a enters the incident side diffraction optical element 22a with an incident angles $\theta_1$, $\theta_2$. That is, as shown in FIG. 3, an angle formed by the incident angle $\theta_1$ and the incident angle $\theta_2$ becomes the angle of view that determines the image size.

In FIG. 3, for simplicity of the description, the light emitting section of the image light generating unit 19 and the light incident section of the light guide unit 20 are shown to be disposed in parallel. Note that the light emitting section of the image light generating unit 19 may be inclined to the light incident section of the light guide unit 20.

The incident angle $\theta_1$ is an incident angle of the light beam of the image light G that enters the incident side diffraction optical element 22a with an orientation away from the emission side diffraction optical element 23a and has a maximum absolute value of the incident angle relative to a normal line 22H of the incident side diffraction optical element 22a. The incident angle $\theta_2$ is an incident angle of the light beam of the image light G that enters the incident side diffraction optical element 22a with an orientation toward the emission side diffraction optical element 23a and has a maximum absolute value of the incident angle relative to the normal line 22H of the incident side diffraction optical element 22a.

In FIG. 3, for the incident angle $\theta_1$ and the incident angle $\theta_2$, a clockwise direction relative to the normal line 22H of the incident side diffraction optical element 22a is defined as positive. Accordingly, the incident angle $\theta_1$ and the incident angle $\theta_2$ are the same in absolute value. The incident angle $\theta_1$ which is in a counterclockwise direction relative to the normal line 22H is a negative value, while the incident angle $\theta_2$ which is in a clockwise direction relative to the normal line 22H is a positive value. For convenience of explanation, the incident angle $\theta_1$ may be hereinafter referred to as a minimum incident angle $\theta_{min}$, while the incident angle $\theta_2$ may be hereinafter referred to as a maximum incident angle $\theta_{max}$.

Figure 4:
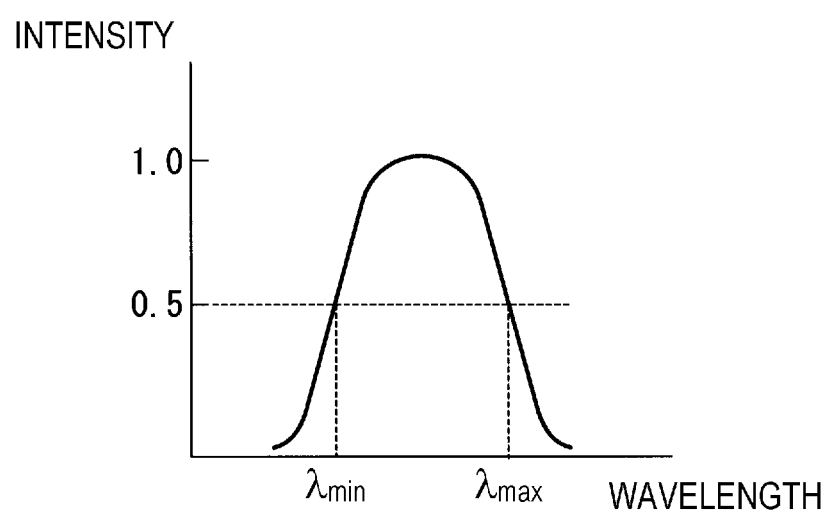
FIG. 4 is a view which shows an example of spectrum of light emitted from a pixel of an image display element.

FIG. 4 is a view which shows an example of spectrum of light emitted from a pixel of the image display element 19a. For simplicity of the description, the image light G is described as a monochromatic green light. In FIG. 4, the horizontal axis represents a wavelength of the image light G and the vertical axis represents a spectrum intensity of the image light G. Of the half wavelengths of the peak intensity of the spectrum of the image light G propagated in the light guide plate 21, the shorter wavelength is denoted as $\lambda_{min}$ and the longer wavelength is denoted as $\lambda_{max}$.

When the wavelength at a significantly low intensity is selected, compensation of uneven brightness of the virtual image becomes difficult. The present embodiment uses $\lambda_{min}$, $\lambda_{max}$ as described above which is the wavelength at which the intensity is half of the peak. As a specific example, the minimum wavelength $\lambda_{min}$ is 500 nm and the maximum wavelength $\lambda_{max}$ is 540 nm.

For good visual recognition of the image (virtual image) by the observer M, the image light G introduced into the light guide plate 21 is required to be well propagated. In this case, a minimum angle of a propagation angle of the image light G propagated in the light guide plate 21, that is, a diffraction angle diffracted into the light guide plate 21 by the incident side diffraction optical element 22a may be taken as a critical angle of the light guide plate 21 so that the range of propagation angle which is propagated by total reflection can be used at the maximum. The minimum angle of the diffraction angle is determined by a grating pitch of the incident side diffraction optical element 22a and a minimum wavelength of the image light G. Although details are described later, the grating pitch of the incident side diffraction optical element 22a and the grating pitch of the emission side diffraction optical element 23a are different in the present embodiment.

Next, light propagation in the light guide unit 20 will be described. As a reference example, the following description uses a light guide optical system having a diffraction optical element as the input/output element, which is similar to the light guide unit 20 of the present embodiment. The light guide optical system differs from the light guide unit 20 of the present embodiment in that it has the grating pitch of the incident side diffraction optical element and the grating pitch of the emission side diffraction optical element which are the same.

Figure 5:
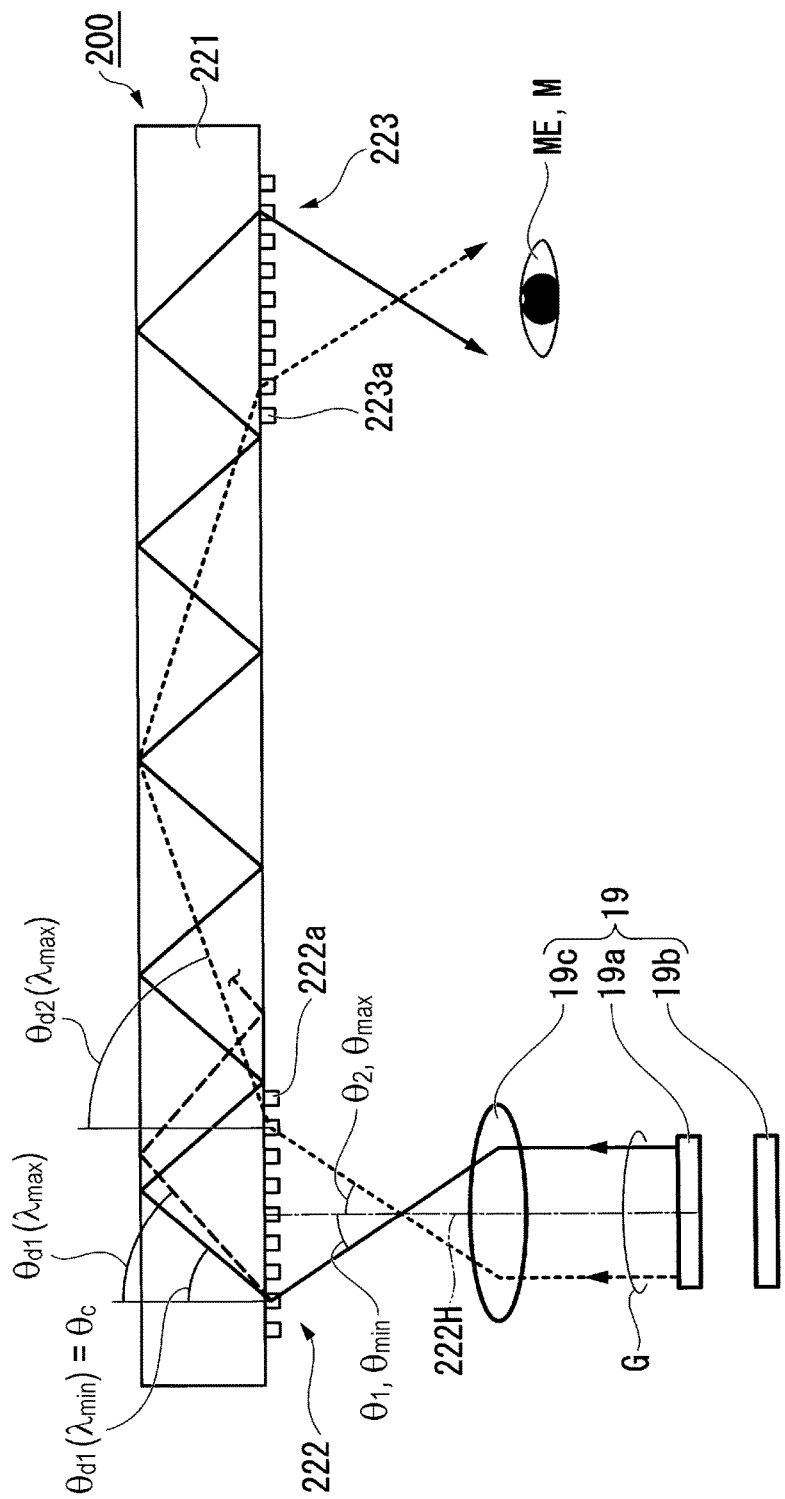
FIG. 5 is a view which shows a configuration of a light guide unit according to a reference example.

FIG. 5 is a view which shows, as a reference example, a configuration of a light guide unit 200 which is a typical light guide plate optical system. As shown in FIG. 5, the light guide unit 200 includes a light guide plate 221, a light incident section 222 and a light emitting section 223. The light guide plate 221 has the same configuration as that of the light guide plate 21.

The light incident section 222 has the same configuration as that of the light incident section 22 and is provided with incident side diffraction optical elements 222a formed of a surface relief diffraction grating and a volume hologram. The light emitting section 223 has the same configuration as that of the light emitting section 23 and is provided with emission side diffraction optical elements 223a formed of a surface relief diffraction grating and a volume hologram. In the light guide unit 200, the image light G from the image light generating unit 19 enters the light incident section 222 with the incident angle in the range from the minimum incident angle $\theta_{min}$ to the maximum incident angle $\theta_{max}$.

Figure 6:
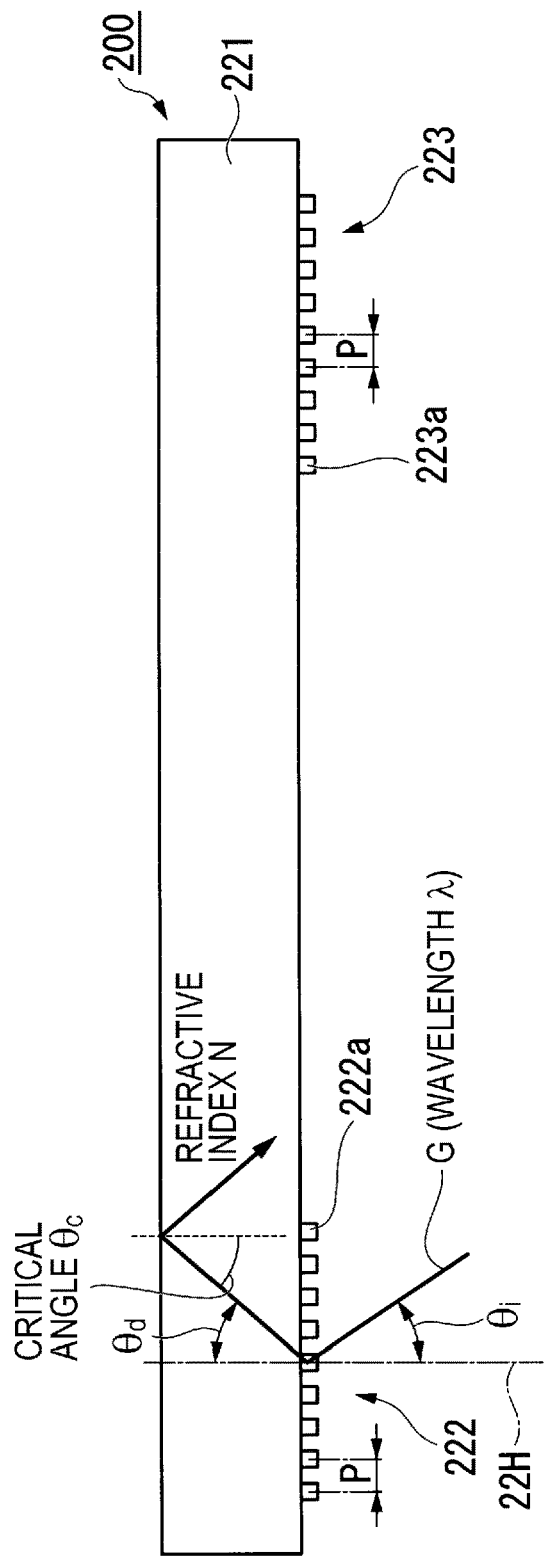
FIG. 6 is an explanatory view of light diffraction in a light incident section in the light guide unit according to a reference example.

FIG. 6 is a view which explains light diffraction in the incident side diffraction optical element 222a of the light guide unit 200. In FIG. 6, for the incident angle and the diffraction angle, a clockwise direction relative to the normal line 222H of the incident side diffraction optical element 222a is defined as positive.

When a refraction factor of the light guide plate 221 is N, a grating pitch of the incident side diffraction optical element 222a is P, a wavelength of the image light G entering the incident side diffraction optical element 222a is $\lambda$, and an incident angle of the image light G is $\theta_i$, a diffraction angle $\theta_d$ is expressed by the following formula (1):

$$\sin \theta_d = (\lambda/P + \sin \theta_i)/N \quad (1)$$

As seen from the formula (1), when an incident angle $\theta_i$ and a refraction factor N of the light guide plate 221 are fixed, the diffraction angle $\theta_d$ decreases as a wavelength $\lambda$ decreases and a grating pitch P increases.

Accordingly, the diffraction angle for light with the minimum wavelength of the image light G becomes smallest. Further, as shown in FIG. 5, in the image light G with the incident angle in the angular range from $\theta_{min}$ to $\theta_{max}$, the diffraction angle becomes smallest for the incident light having the minimum incident angle $\theta_{min}$.

Therefore, when the grating pitch P is determined such that a diffraction angle $\theta_{d1}$ of light with the minimum wavelength $\lambda_{min}$ which enters with the minimum incident angle $\theta_{min}$ is equal to a critical angle $\theta_c$ in the light guide plate 221, the image light G can be propagated in the light guide plate 221 by total reflection.

On the basis of the above formula (1), when the grating pitch P is expressed by the wavelength and the incident angle with the diffraction angle $\theta_d$ represented as the critical angle $\theta_c$, the following formula (2) is derived:

$$P = \lambda/(1 - \sin \theta_i) \quad (2)$$

Here, the diffraction angle of the image light G having the wavelength longer than the minimum wavelength $\lambda_{min}$, for example, light having the maximum wavelength $\lambda_{max}$ which enters with the same minimum incident angle $\theta_{min}$ is always larger than the critical angle, and accordingly, the image light G is propagated in the light guide plate 221 by total reflection. Further, the diffraction angle of light which enters with an incident angle larger than the minimum incident angle $\theta_{min}$ is always larger than the critical angle, and the light can be propagated in the light guide plate 221 by total reflection.

Suppose that the minimum incident angle $\theta_{min}$ is −10 degrees, the maximum incident angle $\theta_{max}$ is +10 degrees, and the refraction factor N of the light guide plate 221 is 1.53. In this case, the grating pitch P in which light with the minimum wavelength $\lambda_{min}$=500 nm which enters with the minimum incident angle $\theta_{min}$=−10 degrees becomes the critical angle $\theta_c$ of the light guide plate 221=40.81 degrees can be calculated on the basis of the above formula (2), resulting in P=426.02 nm.

In the incident side diffraction optical element 222a having the above grating pitch P, the diffraction angle becomes largest when the maximum incident angle $\theta_{max}$=+10 degrees and the maximum wavelength $\lambda_{max}$=540 nm, and accordingly, the diffraction angle $\theta_{d2}$ ($\lambda_{max}$) becomes 70.38 degreed on the basis of the above formula (1).

As described above, the grating pitch of the emission side diffraction optical element 223a is the same as the grating pitch P (426.02 nm) of the incident side diffraction optical element 222a. Further, the grating pitch P corresponds to the grating pitch at the condition that the temperature of the light guide plate 221 is normal temperature (for example, 20° C. to 25° C.). The following description is made for the case where the normal temperature is 20° C. In the present embodiment, the normal temperature (20° C.) means the state in which the image light G is not generated by the image light generating unit 19, that is, the image light generating unit 19 is not in operation.

Moreover, in order to ensure the brightness of the virtual image recognized by the observer M, the intensity of light emitted from the back light 19b is required to be sufficiently increased. That is, electric current supplied to the LED is increased, or alternatively, a plurality of LEDs are used. As a consequence, the amount of heat generated by the back light 19b increases, which causes a temperature of the image light generating unit 19 to increase.

As shown in FIG. 5, the image light generating unit 19 is disposed adjacent to the light incident section 222 of the light guide unit 200. Accordingly, a temperature of the light guide plate 221 in a region in which the incident side diffraction optical element 222a is formed also increases. As a consequence, the light incident section 222 of the light guide plate 221 expands to a slight extent, resulting in that the grating pitch of the incident side diffraction optical element 222a becomes larger than the above grating pitch P.

On the other hand, the temperature of a portion of the light guide plate 221 in which the emission side diffraction optical element 223a is formed in front of the eye ME of the observer M remains to be an environment temperature (normal temperature: 20° C.), and the grating pitch of the emission side diffraction optical element 223a does not change from the above grating pitch P.

Figure 7:
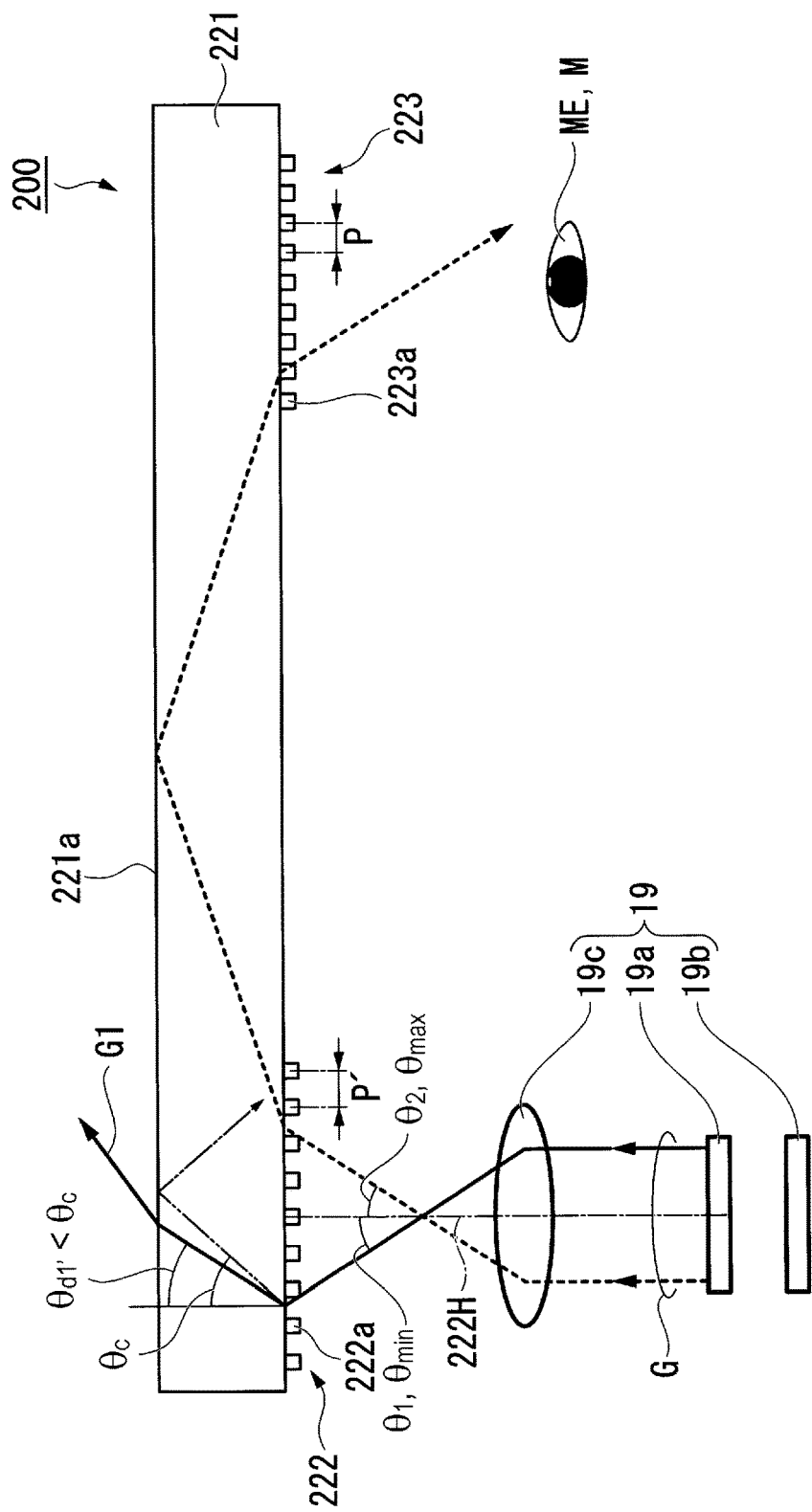
FIG. 7 is a view which shows a light diffraction state of the light guide unit according to a reference example during temperature increase.

As shown by the formula (1), for light with the same incident angle and the same wavelength, the diffraction angle decreases as the grating pitch increases. FIG. 7 shows this situation applied to the light guide plate 221. FIG. 7 is a view which shows a light diffraction state of the light guide unit 200 during a temperature change.

In the light guide unit 200 of the reference example, the grating pitch P is determined without considering a change in the grating pitch due to increase in temperature of the light guide plate 221. Consequently, as shown in FIG. 7, when the light guide plate 221 has a grating pitch P' (>P) due to thermal expansion, a diffraction angle $\theta_{d1}$' becomes smaller than the critical angle $\theta_c$. This causes a failure of total reflection at a surface 221a opposite to a surface on which the incident side diffraction optical element 222a is formed, and causes the light to be transmitted to outside when refracted. As a consequence, the light fails to be propagated in the light guide plate 221 to the emission side diffraction optical element 223a, leading to a loss in a portion of the image light G (a portion of angle of view which corresponds to the incident angle of the light transmitted to outside the light guide plate 221).

As described above, when the grating pitch P of the diffraction optical elements (incident side diffraction optical element 222a and the emission side diffraction optical element 223a) is determined on the basis of normal temperature (for example, 20° C.), a problem occurs that a portion of the image is lost with increase in temperature. In particular, use of the light guide plate 221 made of a plastic material having a large linear expansion coefficient leads to a large loss in the image.

For example, suppose that the temperature of the light guide plate 221 has changed from 20° C. to 45° C. with increase in temperature. In this case, when a linear expansion coefficient α of the light guide plate 221 is 7×10⁻³/° C., the grating pitch P' becomes 426.77 nm as the temperature increases from 20° C. to 45° C., ΔT=25° C. Here, the grating pitch P'=P (1+αΔT).

When the image light G having the minimum incident angle $\theta_{min}$ of −10 degrees, the minimum wavelength $\lambda_{min}$ of 500 nm enters the incident side diffraction optical element 222a having an increased grating pitch P', the diffraction angle $\theta_{d1}$' becomes 40.71 degree, which is smaller than the critical angle θc=40.81 degree.

Accordingly, as shown in FIG. 7, the light is refracted at the rear surface (a surface on which the incident side diffraction optical element 222a is not provided) of the light guide plate 221 and is transmitted to outside the light guide plate 221, leading to a failure in propagation by total reflection in the light guide plate 221. That is, the image light G which corresponds to this incident angle fails to reach the emission side diffraction optical element 223a, which results in a failure in visual recognition by the observer M.

When the grating pitch P' has been increased due to increase in temperature, the incident angle by which the diffraction angle of the minimum wavelength $\lambda_{min}$ becomes the critical angle can be calculated on the basis of the formula (2), resulting in $\theta_{min}$=−9.88 degrees. That is, this means that the image light G which originally has the angle of view of the $|\theta_{min}|$=10 degree is visually recognized by the eye ME of the observer M except for a portion corresponding to approximately 0.1 degrees obtained by subtracting 9.88 degrees from 10 degrees, which is an image light G1.

As described above, the angle of view is an angle between the minimum incident angle $\theta_{min}$ and the maximum incident angle $\theta_{max}$, which is 20 degrees. Accordingly, the lost portion of the virtual image is 0.2 degrees/20 degrees=0.01, that is, approximately 1% in the horizontal direction. The extent of the loss occurred in the virtual image increases depending on the extent of increase in temperature of the light guide plate 221.

Figure 8:
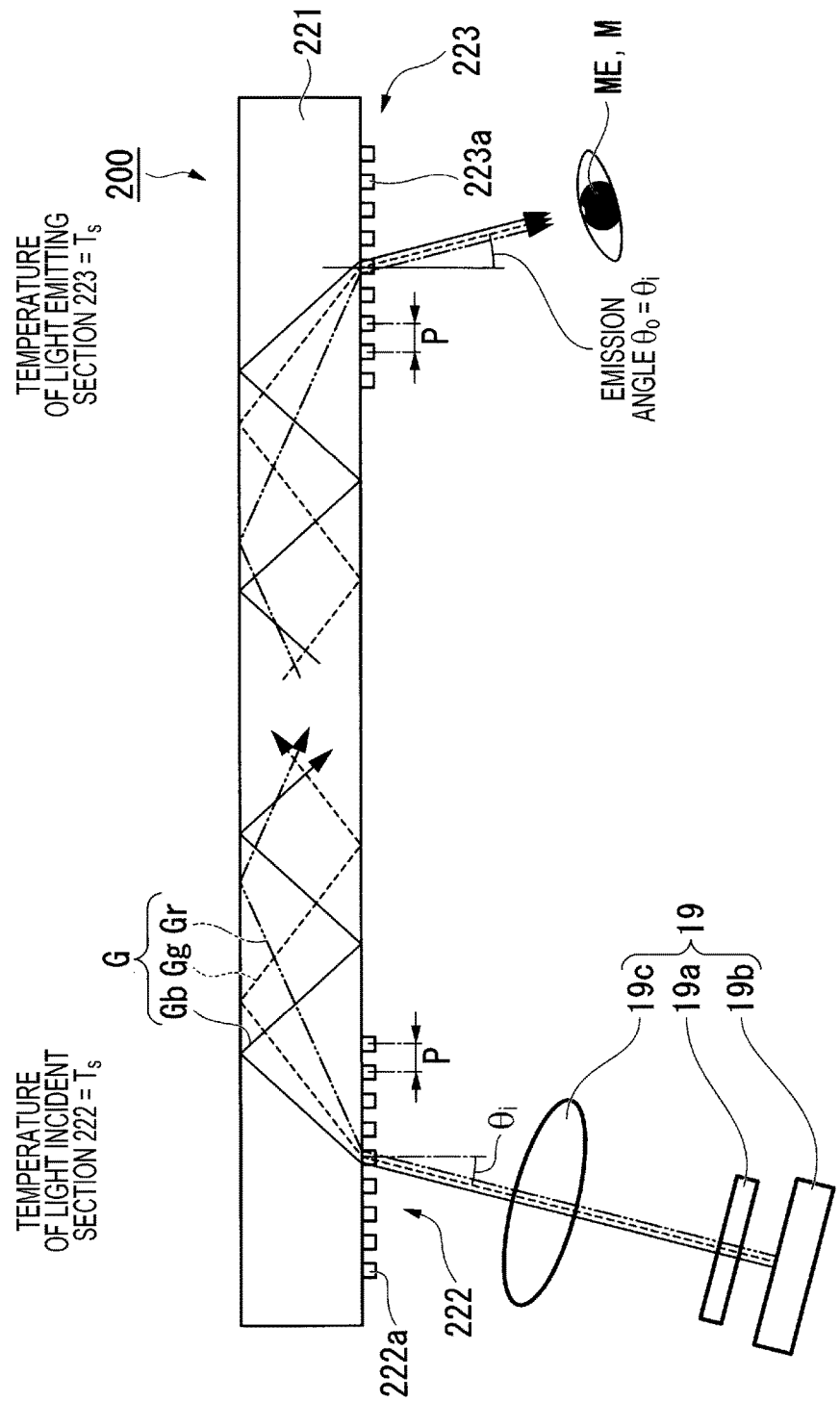
FIG. 8 is a view which shows a state of the light guide unit according to a reference example at room temperature.
Figure 9:
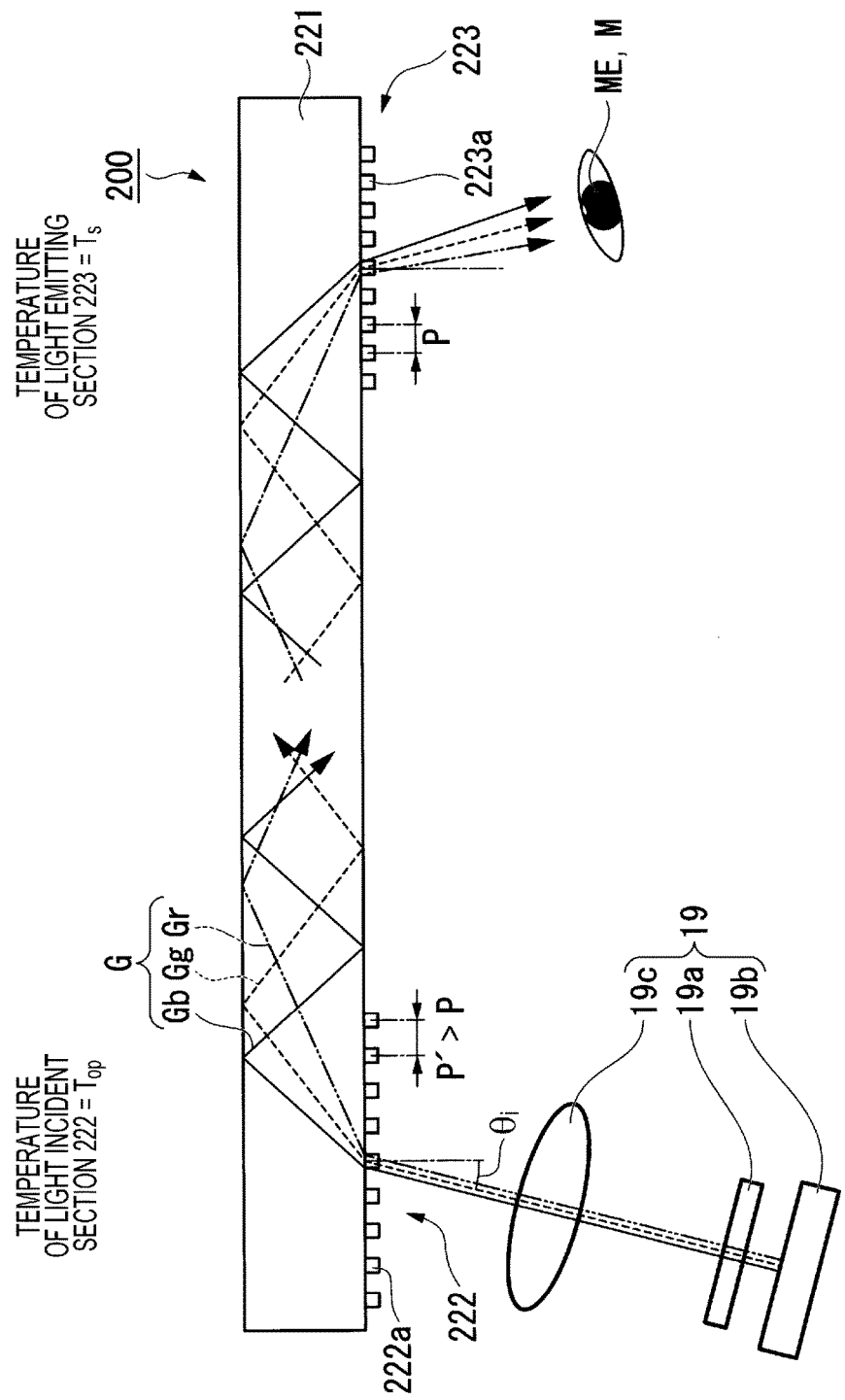
FIG. 9 is a view which shows image light emitted from the light guide unit according to a reference example during temperature increase.

Next, a case where the image light G is a color image will be described. FIG. 8 is a view which shows a state of the light guide unit 200 at normal temperature (20° C.). FIG. 9 is a view which shows image light emitted from the light guide unit 200 during operation of the HMD 300 (45° C.). In FIGS. 8 and 9, the image light G includes a red light Gr, a green light Gg and a blue light Gb, and only a main light beam of each image light G is shown. Further, the light emitting section of the image light generating unit 19 is disposed inclined to the light incident section 222 of the light guide unit 200.

In the state shown in FIG. 8, the light guide plate 221 is at a normal temperature $T_s$, and both the incident side diffraction optical element 222a and the emission side diffraction optical element 223a have the grating pitch P. Accordingly, the image light G which enters the incident side diffraction optical element 222a at the incident angle $\theta_i$ is emitted from the emission side diffraction optical element 223a at the emission angle $\theta_o$ which is the same as the incident angle $\theta_1$ regardless of the color (red light Gr, green light Gg and blue light Gb).

That is, the emission angles have no difference depending on the color, and the colors (red light Gr, green light Gg and blue color Gb) emitted from the pixels of the image display element 19a enter the eye ME of the observer M with the same angle and are recognized as one pixel.

On the other hand, at an operation temperature $T_{op}$ of the HMD 300 shown in FIG. 9, the grating pitch P' of the incident side diffraction optical element 222a becomes larger than the grating pitch P of the emission side diffraction optical element 223a. Accordingly, the red light Gr, the green light Gg and the blue light Gb which enter the incident side diffraction optical element 222a at the incident angle $\theta_1$ are different in emission angle at the emission side diffraction optical element 223a.

That is, the colors (red light Gr, green light Gg and blue color Gb) emitted from the pixels of the image display element 19a enters the eye ME of the observer M at different angles. This causes the pixels to be seen at different positions depending on the colors, leading to blur or ghost in the image.

The light guide unit 20 of the present embodiment is configured such that the grating pitch of the incident side diffraction optical element 22a and the grating pitch of the emission side diffraction optical element 23a become the same at an operation temperature.

Figure 10:
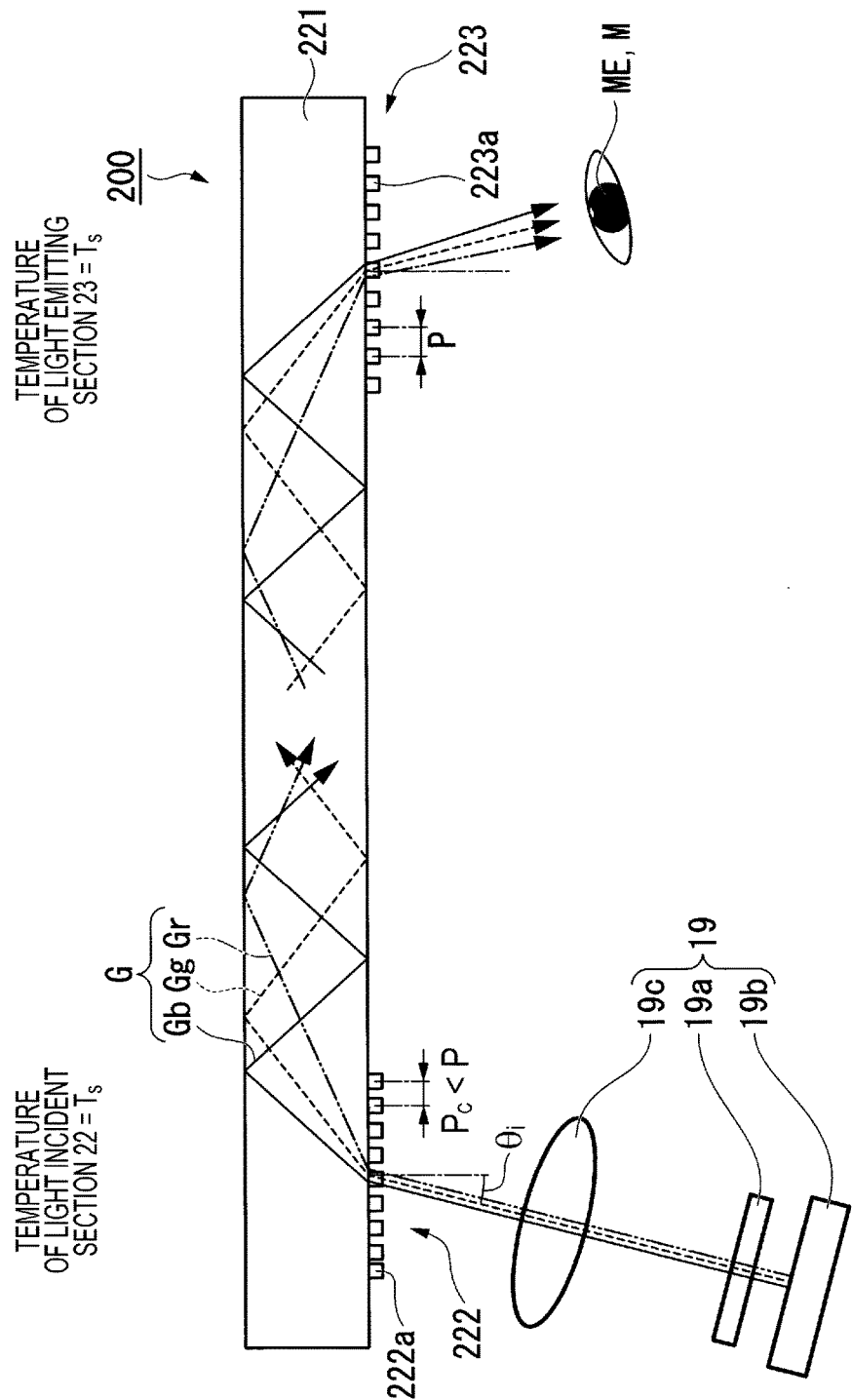
FIG. 10 is a view which shows a state of the light guide unit according to the present embodiment at room temperature.
Figure 11:
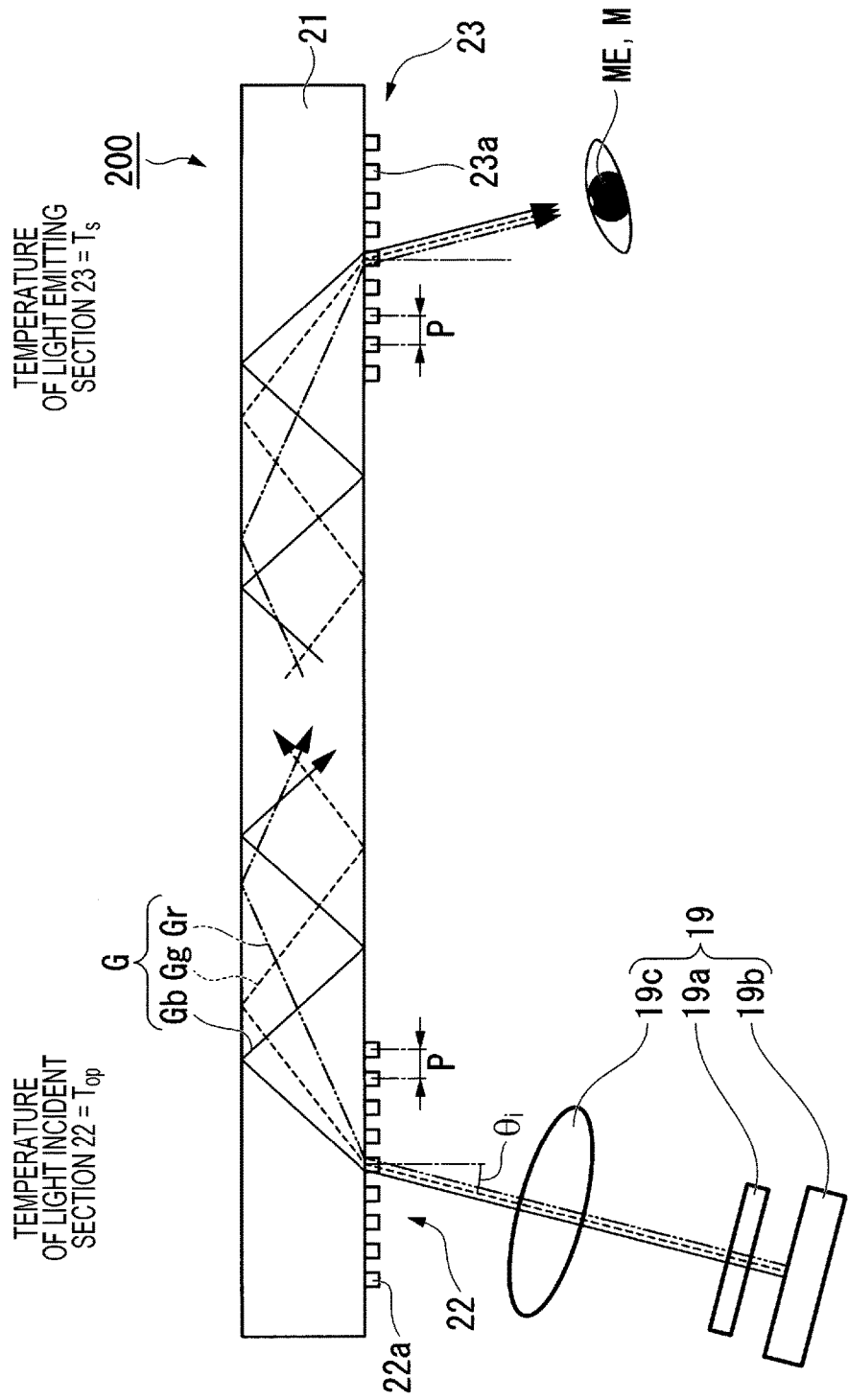
FIG. 11 is a view which shows image light emitted from the light guide unit according to the present embodiment during temperature increase.

FIG. 10 is a view which shows a state of the light guide unit 20 of the present embodiment at normal temperature (20° C.). FIG. 11 is a view which shows image light emitted from the light guide unit 20 of the present embodiment during increase in temperature (45° C.). In FIGS. 10 and 11, the image light G includes the red light Gr, the green light Gg and the blue light Gb, and only a main light beam of each main image light G is shown. Further, the light emitting section of the image light generating unit 19 is disposed inclined to the light incident section of the light guide unit 20.

As shown in FIG. 10, in the light guide unit 20 of the present embodiment, when the light guide plate 21 is at normal temperature, the grating pitch of the emission side diffraction optical element 23a is designed as the grating pitch P at normal temperature and the grating pitch of the incident side diffraction optical element 22a is designed as a temperature compensation grating pitch $P_c$ which is smaller than the grating pitch P at normal temperature. The light guide unit 20 of the present embodiment is configured such that the grating pitch (temperature compensation grating pitch $P_c$) of the incident side diffraction optical element 22a and the grating pitch P of the emission side diffraction optical element 23a are different when the image light generating unit 19 is not in operation.

As shown in FIG. 11, when the back light 19b of the image light generating unit 19 is ON to display an image, the temperature of the light incident section 22 increases, and accordingly, the operation temperature $T_{op}$ becomes higher than a normal temperature $T_s$ ($T_{op}$>$T_s$). As the temperature increases, the grating pitch of the incident side diffraction optical element 22a becomes large. In the present embodiment, the temperature compensation grating pitch $P_c$ is designed to compensate a difference occurred between the grating pitch of the incident side diffraction optical element 22a and the grating pitch of the emission side diffraction optical element 23a by the temperature compensation grating pitch $P_c$ that becomes large with increase in temperature and becomes almost the same as the grating pitch P at normal temperature.

That is, when a linear expansion coefficient of the light guide plate 21 is a, the temperature compensation grating pitch $P_c$ and the grating pitch P at normal temperature are expressed by the following formula (3):

$$P = P_c \times [1 + \alpha(T_{op} - T_s)] \qquad (3)$$

Thus, the light guide unit 20 of the present embodiment can reduce blur or ghost in the image due to increase in temperature of the image light generating unit 19 by allowing the grating pitch (temperature compensation grating pitch $P_c$) of the incident side diffraction optical element 22a at normal temperature (20° C.) to be smaller than the grating pitch P of the emission side diffraction optical element 23a.

In the present embodiment, it is preferable that the grating pitch (temperature compensation grating pitch $P_c$) of the incident side diffraction optical element 22a in the light guide unit 20 is configured so that the diffraction angle of the incident light having the minimum incident angle $\theta_{min}$ and the minimum wavelength $\lambda_{min}$ becomes the same as or more than the critical angle of the light guide plate 21 at the expected maximum temperature of the light guide plate 21 in use of the HMD 300.

The maximum temperature of the light guide plate 21 may be selected as appropriate depending on the type of the light guide plate 21 and the image light generating unit 19 used. Further, when the image light G is a color image, the minimum wavelength $\lambda_{min}$ may be determined on the basis of the blue light Gb in the image light G which includes a wavelength range from blue to red.

In the grating pitch P of the incident side diffraction optical element 22a at the maximum temperature during use of the light guide plate 21 in use of the HMD 300, the diffraction angle for the light of the image light G which enters the incident side diffraction optical element 22a at the minimum incident angle $\theta_{min}$ and the minimum wavelength $\lambda_{min}$ becomes the same as or largely different from the critical angle calculated from the refraction factor of the light guide plate 21 with the same wavelength. The grating pitch P of the incident side diffraction optical element 22a is expressed by the following formula (4):

$$P \leq \lambda_{min}/(1-\sin \theta_{min}) \qquad (4)$$

According to the light guide unit 20 having the incident side diffraction optical element 22a which satisfies the formula (4), blur or ghost in the image can be reduced even if the light incident section 22 of the light guide plate 21 reaches the maximum temperature in use of the HMD 300.

Alternatively, the grating pitch (temperature compensation grating pitch $P_c$) of the incident side diffraction optical element 22a in the light guide unit 20 may also be configured so that the diffraction angle of the incident light having the minimum incident angle $\theta_{min}$ and the minimum wavelength $\lambda_{min}$ becomes the same or more than the critical angle of the light guide plate 21 at a temperature lower than the expected maximum temperature of the light guide plate 21 in use of the HMD 300 (for example, at normal temperature or more and less than the maximum temperature).

In the grating pitch P of the incident side diffraction optical element 22a at a temperature lower than the maximum temperature of the light guide plate 21, the diffraction angle for the light of the image light G which enters the incident side diffraction optical element 22a at the minimum incident angle $\theta_{min}$ and the minimum wavelength $\lambda_{min}$ becomes larger than the critical angle calculated from the refraction factor of the light guide plate 21 with the same wavelength. The grating pitch P of the incident side diffraction optical element 22a is expressed by the following formula (5):

$$P < \lambda_{min}/(1-\sin \theta_{min}) \qquad (5)$$

According to the light guide unit 20 having the incident side diffraction optical element 22a which satisfies the formula (5), blur or ghost in the image can be reduced even if the light incident section 22 of the light guide plate 21 reaches a temperature lower than the maximum temperature in use of the HMD 300.

The grating pitch (temperature compensation grating pitch $P_c$) of the incident side diffraction optical element 22a in the light guide unit 20 may be at least configured so that the diffraction angle of the incident light having the minimum incident angle $\theta_{min}$ and the minimum wavelength $\lambda_{min}$ becomes larger than the critical angle of the light guide plate 21 at normal temperature (for example, 20° C.)

In the grating pitch P of the incident side diffraction optical element 22a at normal temperature of the light guide plate 21, the diffraction angle for the light of the image light G which enters the incident side diffraction optical element 22a at the minimum incident angle $\theta_{min}$ and the minimum wavelength $\theta_{min}$ becomes larger than the critical angle calculated from the refraction factor of the light guide plate 21 with the same wavelength. The grating pitch P of the incident side diffraction optical element 22a is expressed by the following formula (6):

$$P < \lambda_{min}/(1-\sin \theta_{min}) \qquad (6)$$

According to the light guide unit 20 having the incident side diffraction optical element 22a which satisfies the formula (6), blur or ghost in the image can be reduced even if the light incident section 22 of the light guide plate 21 is increased slightly higher than the normal temperature in use of the HMD 300.

When the diffraction angle of the diffraction light by the incident side diffraction optical element 22a becomes larger than the critical angle of the light guide plate 21, the image light G with a predetermined angle of view is propagated in the light guide plate 21 by total reflection and reaches the emission side diffraction optical element 23a.

Depending on the usage of the HMD 300, the temperature of the light emitting section 23 is not necessarily at normal temperature, and the temperature within the usage temperature of the product is allowable. In this case as well, since the temperature of the light incident section 22 becomes higher than the temperature of the light emitting section 23 with increase in temperature of the image light generating unit 19, occurrence of blur or ghost in the image may be slightly prevented by providing the grating pitch of the incident side diffraction optical element 22a provided in the light incident section 22 at normal temperature to be smaller than the grating pitch of the emission side diffraction optical element 23a provided in the light emitting section 23.

As described above, as long as any of the above formulae (4) to (6) is established in the incident side diffraction optical element 22a, the light guide unit 20 can prevent blur or ghost in the image even if the grating pitch increases due to increase in temperature of the image light generating unit 19, compared with the case where both the incident side diffraction optical element 22a and the emission side diffraction optical element 23a have the grating pitch at normal temperature.

Further, since the grating pitch can be prevented from being deviated due to increase in temperature of the image light generating unit 19, a problem such as a portion of the image light G failing to be recognized by the eye ME of the observer M as described in FIG. 7 can be prevented.

Furthermore, the technical scope of the present invention is not limited to the above embodiment, and various modifications can be made within a spirit of the present invention.

For example, in the above embodiment, an example in which the grating pitch of the incident side diffraction optical element 22a and the grating pitch of the emission side diffraction optical element 23a are different is described by referring to a case where the grating pitch of the incident side diffraction optical element 22a is smaller than the grating pitch of the emission side diffraction optical element 23a when the light guide plate 21 is at normal temperature. However, the present invention is not limited thereto.

In the present embodiment, the grating pitch of the incident side diffraction optical element 22a may be larger than the grating pitch of the emission side diffraction optical element 23a when the light guide plate 21 is at normal temperature. With this configuration, occurrence of blur or ghost in the image may be slightly prevented under environment where the grating pitch of the emission side diffraction optical element 23a becomes large, for example, due to the light emitting section 23 which becomes large relative to the light incident section 22 in use of the HMD.

Further, the above embodiment is described by means of an example in which the grating pitch of the incident side diffraction optical element 22a is determined considering a case where only the light incident section 22 in the light guide plate 21 expands due to increase in temperature in use of the HMD 300 and the light emitting section 23 remains at normal temperature. However, the present embodiment is not limited thereto. That is, depending on a usage environment, it may be assumed that the light emitting section 23 contracts when cooled from normal temperature. Accordingly, the grating pitch of the incident side diffraction optical element 22a and the grating pitch of the emission side diffraction optical element 23a may be designed to be different so as to prevent occurrence of blur or ghost in the image when the light guide plate 21 undergoes contraction (decrease in the grating pitch).

In the above embodiment, use of a color light as the image light G is described by using an example in which the light guide unit 20 is formed of a single light guide plate 21. However, a light guide plate that allows propagation of the image light having a blue light spectrum (blue light Gb), a light guide plate that allows propagation of the image light having a green light spectrum (green light Gg), and a light guide plate that allows propagation of the image light having a red light spectrum (red light Gr) may be separately produced and overlapped each other so as to achieve a light guide unit of a diffraction light guide plate type that allows for color display.

Further, in the above embodiment, the light guide plate 21 is made of a material of a plastic having a high linear expansion coefficient. However, a glass having a low linear expansion coefficient may also be applied to the present embodiment.

In the above embodiment, the image light G which includes red light Gr, green light Gg and blue light Gb was described as an example. However, the present embodiment is not limited thereto. A monochromatic image light having a spectrum containing a wide range of wavelengths may also be used.

The entire disclosure of Japanese Patent Application No. 2016-058107, filed Mar. 23, 2016 is expressly incorporated by reference herein.

What is claimed is:

1. An image display apparatus comprising:
an image light generating unit that emits image light;
a light guide plate in which the image light emitted from the image light generating unit is incident;
an incident side diffraction optical element disposed in a light incident section of the light guide plate; and
an emission side diffraction optical element disposed in a light emitting section of the light guide plate, wherein
a grating pitch of the incident side diffraction optical element and a grating pitch of the emission side diffraction optical element are different in a state where the image light generating unit is not in operation, and
wherein the following formula is established when a minimum incident angle at which a diffraction angle by the incident side diffraction optical element becomes minimum among incident angles of a light beam of the image light which enters the incident side diffraction optical element is $\theta_{min}$, a shorter wavelength of wavelengths at a half of a peak intensity of spectrum of the image light is $\lambda_{min}$, and the grating pitch of the incident side diffraction optical element at a maximum temperature during use of the light guide plate is P:

$$P \leq \lambda_{min}/(1-\sin\theta_{min}).$$

2. The image display apparatus according to claim 1, wherein the light guide plate is made of a plastic material.

3. The image display apparatus according to claim 1, wherein the incident side diffraction optical element and the emission side diffraction optical element are surface relief diffraction gratings.

4. The image display apparatus according to claim 1, wherein the incident side diffraction optical element and the emission side diffraction optical element are volume holograms.

5. An image display apparatus comprising:
an image light generating unit that emits image light;
a light guide plate in which the image light emitted from the image light generating unit is incident;
an incident side diffraction optical element disposed in a light incident section of the light guide plate; and
an emission side diffraction optical element disposed in a light emitting section of the light guide plate, wherein
a grating pitch of the incident side diffraction optical element and a grating pitch of the emission side diffraction optical element are different in a state where the image light generating unit is not in operation, and
wherein the following formula is established when a minimum incident angle at which a diffraction angle by the incident side diffraction optical element becomes minimum among incident angles of a light beam of the image light which enters the incident side diffraction optical element is $\theta_{min}$, a shorter wavelength of wavelengths at a half of a peak intensity of spectrum of the image light is $\lambda_{min}$, and the grating pitch of the incident side diffraction optical element at a temperature of the light guide plate lower than the maximum temperature during use is P:

$$P < \lambda_{min}/(1-\sin\theta_{min})$$

6. The image display apparatus according to claim 5, wherein the light guide plate is made of a plastic material.

7. The image display apparatus according to claim 5, wherein the incident side diffraction optical element and the emission side diffraction optical element are surface relief diffraction gratings.

8. The image display apparatus according to claim 5, wherein the incident side diffraction optical element and the emission side diffraction optical element are volume holograms.

9. An image display apparatus comprising:
an image light generating unit that emits image light;
a light guide plate in which the image light emitted from the image light generating unit is incident;
an incident side diffraction optical element disposed in a light incident section of the light guide plate; and
an emission side diffraction optical element disposed in a light emitting section of the light guide plate, wherein a grating pitch of the incident side diffraction optical element and a grating pitch of the emission side diffraction optical element are different in a state where the image light generating unit is not in operation, and wherein the following formula is established when a minimum incident angle at which a diffraction angle by the incident side diffraction optical element becomes minimum among incident angles of a light beam of the image light which enters the incident side diffraction optical element is $\theta_{min}$, a shorter wavelength of wavelengths at a half of a peak intensity of spectrum of the image light is $\lambda_{min}$, and the grating pitch of the incident side diffraction optical element when a temperature of the light guide plate is normal temperature is P:

$$P<\lambda_{min}/(1-\sin\theta_{min}).$$

10. The image display apparatus according to claim 9, wherein the light guide plate is made of a plastic material.

11. The image display apparatus according to claim 9, wherein the incident side diffraction optical element and the emission side diffraction optical element are surface relief diffraction gratings.

12. The image display apparatus according to claim 9, wherein the incident side diffraction optical element and the emission side diffraction optical element are volume holograms.

13. An optical element comprising:
a light guide plate which includes a light incident section and a light emitting section and is configured to propagate light incident from the light incident section by total reflection and to emit light from the light emitting section;
an incident side diffraction optical element disposed in the light incident section; and
an emission side diffraction optical element disposed in the light emitting section, wherein
a grating pitch of the incident side diffraction optical element and a grating pitch of the emission side diffraction optical element are different in a state where the light is not incident, and
wherein the following formula is established when a minimum incident angle at which a diffraction angle by the incident side diffraction optical element becomes minimum among incident angles of a light beam of the image light which enters the incident side diffraction optical element is $\theta_{min}$, a shorter wavelength of wavelengths at a half of a peak intensity of spectrum of the image light is $\lambda_{min}$, and the grating pitch of the incident side diffraction optical element at a maximum temperature during use of the light guide plate is P:

$$P\leq\lambda_{min}/(1-\sin\theta_{min}).$$

14. An optical element comprising:
a light guide plate which includes a light incident section and a light emitting section and is configured to propagate light incident from the light incident section by total reflection and to emit light from the light emitting section;
an incident side diffraction optical element disposed in the light incident section; and
an emission side diffraction optical element disposed in the light emitting section, wherein
a grating pitch of the incident side diffraction optical element and a grating pitch of the emission side diffraction optical element are different in a state where the light is not incident, and
wherein the following formula is established when a minimum incident angle at which a diffraction angle by the incident side diffraction optical element becomes minimum among incident angles of a light beam of the image light which enters the incident side diffraction optical element is $\theta_{min}$, a shorter wavelength of wavelengths at a half of a peak intensity of spectrum of the image light is $\lambda_{min}$, and the grating pitch of the incident side diffraction optical element at a temperature of the light guide plate lower than the maximum temperature during use is P:

$$P<\lambda_{min}/(1-\sin\theta_{min}).$$

15. An optical element comprising:
a light guide plate which includes a light incident section and a light emitting section and is configured to propagate light incident from the light incident section by total reflection and to emit light from the light emitting section;
an incident side diffraction optical element disposed in the light incident section; and
an emission side diffraction optical element disposed in the light emitting section, wherein
a grating pitch of the incident side diffraction optical element and a grating pitch of the emission side diffraction optical element are different in a state where the light is not incident, and
wherein the following formula is established when a minimum incident angle at which a diffraction angle by the incident side diffraction optical element becomes minimum among incident angles of a light beam of the image light which enters the incident side diffraction optical element is $\theta_{min}$, a shorter wavelength of wavelengths at a half of a peak intensity of spectrum of the image light is $\lambda_{min}$, and the grating pitch of the incident side diffraction optical element when a temperature of the light guide plate is normal temperature is P:

$$P<\lambda_{min}/(1-\sin\theta_{min}).$$

* * * * *